Jan. 10, 1928. 1,655,430
H. L. MERRICK
ELECTRIC CIRCUIT CLOSING MEANS
Filed May 10, 1924
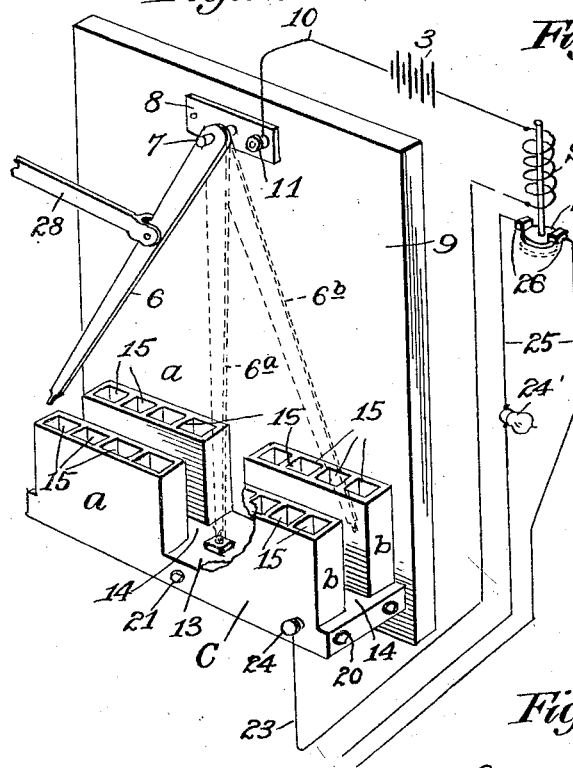
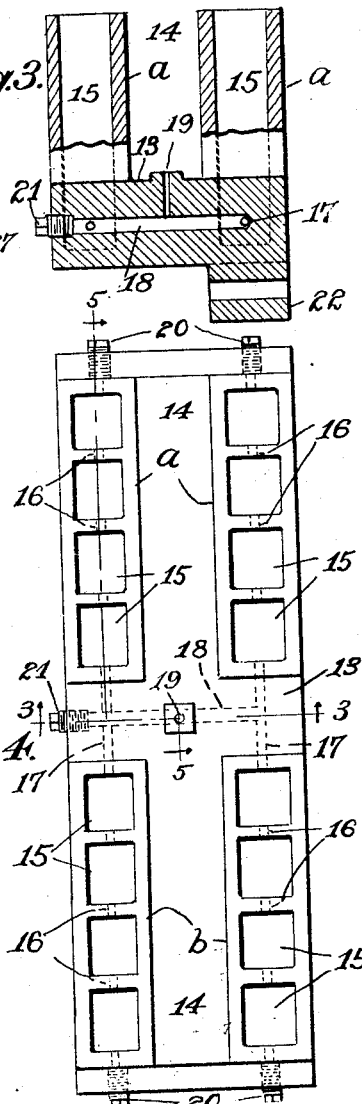
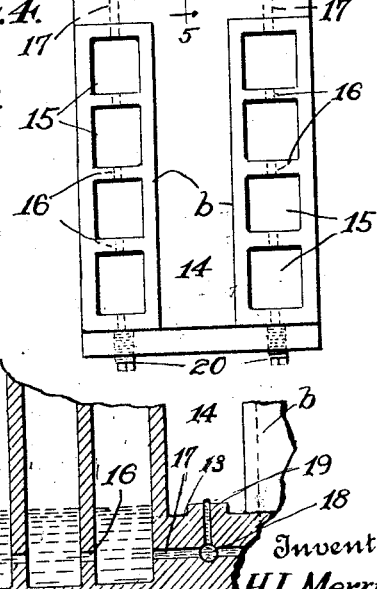
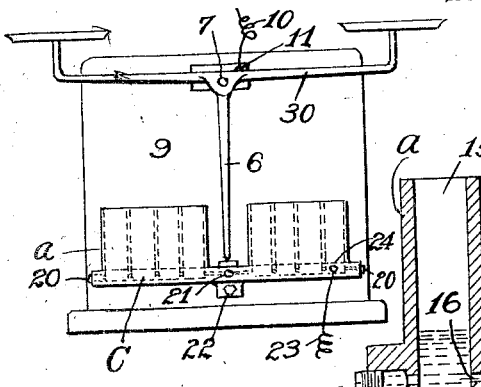
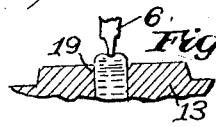
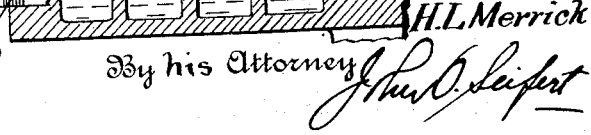
Inventor
H. L. Merrick
By his Attorney Patented Jan. 10, 1928.

1,655,430

UNITED STATES PATENT OFFICE.

HERBERT L. MERRICK, OF PASSAIC, NEW JERSEY.

ELECTRIC-CIRCUIT-CLOSING MEANS.

Application filed May 10, 1924. Serial No. 712,244.

This invention relates to electric circuit closing means including a movable contact member operative from a moving part of a mechanism or apparatus to contact with a contact member of a mobile electric current conducting material connected in the circuit with the movable contact member which is to be closed, said mobile contact being in the form of a globule projected into the path of the movable member by the head of the mobile material of which said globule forms a part, whereby there will be practically no frictional resistance to the movement of the movable contact member which might affect the mechanism or apparatus from which the movable contact member is actuated, and it is the object of the invention to provide an electric circuit closing means of this character which is simple in structure, positive and constant in operation.

The invention is particularly adapted for use in connection with balances and automatic weighing mechanism to cause an indicator to be actuated to indicate the condition of the weighing mechanism, such for instance as to indicate whether it is in overload or underload position or in equilibrium, or to close the circuit at a predetermined position of the weighing mechanism to actuate a signal device, a recording mechanism or a printing mechanism, and to open the circuit when the weighing mechanism is moved out of said position.

In the drawing accompanying and forming a part of this specification Figure 1 is a perspective view of an electric circuit closing device showing an embodiment of a construction and arrangement in accordance with my invention the same being arranged upon a mounting support therefor and in electrical connection with an electric circuit maker and breaker to be controlled by the circuit closing means for actuating a signal or indicating device.

Figure 2 is a front elevation of a balance showing my invention applied thereto operative to close the circuit of an indicating device to be actuated when the balance is in equilibrium.

Figure 3 is a cross sectional view taken on the line 3—3 of Figure 4 looking in the direction of the arrow.

Figure 4 is a plan view on an enlarged scale of a carrier or container for a body of mobile electric current conducting material arranged with a restricted perforation from which a globule of the mobile material is adapted to be projected by the head of said material in the container.

Figure 5 is a sectional side elevation, partly broken away, taken on the line 5—5 of Figure 4 looking in the direction of the arrows; and Figure 6 is a detail view showing the globule of mobile conducting material projected from a perforation in the container for said material and which globule constitutes one of the contact members of the circuit closing means, to show the manner of the other contact member contacting with said globule to close the circuit.

Similar characters of reference designate like parts throughout the different views of the drawing.

In the embodiment of the invention shown in the drawing a contact member in the form of a blade or arm 6 of conducting material is pivotally suspended from a pin 7 or the like fixed in and projecting from a conductor plate 8 secured to a panel 9 of insulating material, which panel may serve as a mounting support for the circuit closing means. The contact member 6 is electrically connected to a source of electricity or current supply, such as a battery 3, through the pivot pin 7 and supporting plate 8 by a conductor 10 connected to a binding post 11 carried by the contact supporting plate 8.

A body of mobile current conducting material 12, such as mercury, is contained within a carrier or container C. This container is of what may be termed U-shape having a connecting portion arranged with a restricted port through the upper wall with the surface of the material in the container above said connecting portion to provide an effective head of the material to project a globule of the material beyond the outer surface of the connection portion of the container, the head of the material exerting a force sufficient so that the surface or skin tension of the material will prevent the globule from rupturing and a consequent flow of the material from the container through said port.

The container or carrier for the mobile conducting material comprises two pairs of chambers $a$, $a$, and $b$, $b$ arranged in spaced relation by a connecting portion 13 which is in a substantially horizontal plane, and the chambers of each pair of chambers arranged in spaced relation, as shown at 14. Each of the chambers a, a and b, b are of greater length than width and separated into juxtaposed vertical compartments 15. The container C is preferably of integral structure of conducting material, as metal, and adapted to be mounted upon the mounting panel 9, as by attachment means passing through a perforated lug 22 extending from the bottom of the container and engaging in the panel, and arranged so that the pivoted contact arm 6 may oscillate in the space 14 between the respective chambers, as indicated in full and dotted lines in Figure 1. The material in one compartment of the chambers is in communication with the material in an adjacent compartment through ports 16 through the lower portion of the separating partitions of the compartments, and one chamber of the chambers a, a in communication with a chamber of the chambers b, b through passages 17 extending through the connecting portion 13 of the chambers, which passages are in communication with each other through a passage 18 with which a port 19 extending vertically through the top wall of the connecting portion 13 communicates, said port 19 being arranged in line with the path of movement of the oscillatory contact member 6 but in a plane so that the extremity of the free end thereof will not contact therewith in its movement. The port 19 is restricted relative to the passages 17 and 18. The port 16 and passages 17 are formed by drilling in through the end walls of the container and the closing of said drill-holes by plugs 20 (Figure 5), and the transverse passage 18 with which the port 19 communicates is drilled through the side wall of the container and the drill hole closed by a plug 21. The mobile current conducting material is connected in circuit with the battery through the material of the container by a conductor 23 connected to a binding post mounted on the container.

As stated the circuit closing means is adapted to be actuated from a mechanism or apparatus to close an electric circuit to actuate a signal or indicator to indicate a condition of such mechanism or apparatus. In the present instance this is illustrated as a signal shown as an electric lamp 24 connected by a conductor 25 in a lighting circuit with a source of electricity (not shown), said conductor having contact terminals 26 arranged therein through which the circuit is adapted to be opened and closed by a circuit closing and opening contact member 27, actuated by a closing of the circuit for the battery B. The contact actuator is shown as a solenoid magnet (indicated in a general way at S) interposed in the conductor 23 and to the core of which solenoid the contact member 27 is connected in insulated relation thereto.

The quantity of mercury in the compartments of the chambers of the container is such that the hydraulic head thereof will be effective to project a portion of the material through the restricted port 19 so that it will project beyond the top of the connecting portion 13 and into the path of the contact member 6 so that said member will contact with the globule when it is in the vertical position indicated in dotted lines at 6ª in Figure 1 and thereby close the circuit through the mercury, container and conductor 23, and the contact member 6 and the conductor 10. As the circuit of battery B is closed the coil of the solenoid will be energized causing the solenoid core to move the connected contact member 27 from the dotted line to the full line position and close the circuit of the lamp 24 through the contact terminals 26.

The globule of the mobile conducting material projected from the port 19 is held intact by the surface or skin tension of the material, and the effective head of the mercury in the container is such as not to project the globule to such an extent that the surface of the globule will be ruptured or broken by the contact 6, but such that the contact will just come in contact with the globule with practically no friction to retard the movement of the contact 6 and to distort the surface of the material of the globule as shown in Figure 6.

The contact member 6 is adapted to close the circuit in a predetermined position thereof and to open the circuit when it is moved out of said position, and to indicate the condition of a mechanism or apparatus. The circuit closing means is adapted for use in connection with weighing mechanism, and particularly automatic weighing mechanism, to indicate whether the weighing mechanism is in overload or underload position or in position of equilibrium, the same being shown in the present instance for illustrative purposes to indicate the position of equilibrium of a weighing mechanism. For this purpose the weighing mechanism, such as a scale beam, (not shown) is operatively connected to the contact member 6 by a connector 28. (Figure 1.) As the weighing mechanism is in overload position the contact member 6 will be moved to the full line position shown in Figure 1. When the mechanism is in underload position it will be moved in the position indicated in dotted lines 6ᵇ, and when the mechanism is in equilibrium the contact member will be moved to the position 6ª in contact with the globule projecting beyond the port 19 thereby closing the circuit for the signal or lamp 24.

In commercial use of this circuit closing means great difficulty has been found to prevent the head of the material carried in the container from exerting such a force as to project the globule from the port 19 to such an extent as to subject the same to too great a stress as to rupture the globule with the consequent flow of the material from the container through the port 19. If the level of the mercury was too low there would not be sufficient head to project the globule from the port a distance sufficient to allow the contact 6 to contact therewith. If additional mercury was supplied to the container to raise the level and head thereof the globule would be projected a sufficient distance to permit the contact member 6 to contact therewith. However, any ordinary vibration caused the globule to break and the mercury to flow from the container through the port 19 until such a quantity of the mercury had run out that there would not be sufficient in the container to project a portion thereof in the form of a globule through the port 19. After extended experiment it was found that the cause of the globule or mercury to break was due to the surging of the mercury in the container caused by ordinary vibration, which surging of the material caused a momentary increase in the effective head of the material in the container which was sufficient to exert a force to break the globule projected from the port 19 and the consequent flow of the mercury from the container. To overcome this disadvantage and prevent the surging of the mercury the container was separated into the juxtaposed chambers, which arrangement of the container maintains the mercury practically stable under all conditions of excessive vibration and even when subjected to sudden jars.

In Figure 2 I have shown the invention applied to an ordinary balance consisting of a counterbalance lever 30 pivotally supported intermediate its ends by the pivot pin 7 upon the mounting panel 9 and arranged with load supports at opposite ends. The contact making member 6 is fixed to the pivot support to participate in the movement thereof. The carrier C for the mobile current conducting material 12 is arranged on the mounting panel in a manner as hereinbefore described so that the projected globule will be in position for contact by the contact member 6 when the balance is in equilibrium to close the circuit and adapted to open the circuit when the contact 6 is moved out of said position.

Having thus described my invention I claim:

1. In an electric circuit closure, a movable contact member arranged for connection in circuit with a source of electricity, and a carrier for a body of mobile electric current conducting material arranged for connecting said material in the circuit of said movable contact with the source of electricity, said carrier having a port in line with the movement of the movable contact through which a globule of the mobile material is adapted to be projected by the hydraulic head of the body of said material for contact by the contact member at a predetermined point in the movement thereof to close the circuit.

2. In an electric circuit closure, a movable contact member arranged for connection in circuit with a source of electricity, a mobile current conducting material, and a container for said material having means for connecting the mobile material carried therein in the circuit of the movable contact with the source of electricity and having a port below the level of the mobile material therein and arranged in line with the movement of the movable contact, the hydraulic head of the mobile material in said container being adapted to project a globule of the material through the port beyond the surface of the wall of the container about said port for contact by the movable contact member to close the circuit.

3. In electric circuit closing means, circuit closing and opening means connected in a normally open circuit and normally assuming a position to maintain the circuit open, including a movable contact connected in the circuit; and a container for a body of mobile electric current conducting material arranged for connecting said material in circuit with the movable contact, said container having a port arranged in line with the movement of the movable contact and through which port the hydraulic head of the body of the mobile material is adapted to project a globule of said material and retained in projected position by the surface tension of said material to be engaged by the movable contact to close the circuit of the circuit closing means.

4. In an electric circuit closer, a contact member arranged for connection with a source of electricity; a U-shaped container for a mobile current conducting material having a port in the connecting portion between the legs of said container through which a globule of the mobile material is adapted to be projected by the hydraulic head of the material in the container and held intact in projected position by the surface tension of the material for contact by the contact member to close the circuit; and means carried by the container for connecting the mobile material with the source of electricity.

5. In an electric circuit closer, a movable contact member arranged for connection with a source of electricity; a mobile current conducting material; a U-shaped container for said material arranged with means for connecting the mobile material carrier therein with the source of electricity and having a port in the connecting portion between the legs of the container in line with the movement of the movable contact member, and through which port a globule of the mobile material is adapted to be projected by the hydraulic head of the material in the container for contact by the movable contact member to close the circuit, and said container being arranged to prevent surging of the mobile material and an increase in the effective head of said material in the container.

6. In an electric circuit closer, a contact member arranged for connection with a source of electricity, and a carrier for a body of mobile electric current conducting material having a port and arranged for connecting said material with the source of electricity, the hydraulic head of the material in the carrier being adapted to project a globule of the material beyond the port for contact by the contact member to close the circuit, and said carrier arranged to prevent surging of the mobile material and an increase in the effective head of said material in the container.

7. In an electric circuit closer, a contact member arranged for connection with a source of electricity, and a carrier for a body of mobile electric current conducting material having a port and arranged for connecting said material with the source of electricity, the hydraulic head of the material in the carrier being adapted to project a globule of the material beyond the port for contact by the contact member to close the circuit, and said carrier arranged with a series of compartments in communication with each other and the restricted port for the purpose specified.

8. In an electric circuit closer, a movable contact arranged for connection with a source of electricity, and a carrier for a body of mobile electric current conducting material, comprising connected chambers with the connecting portion arranged in a plane below the top of the chambers and having a port therein in interposed relation to the chambers and in line with the movement of the movable contact members, and the hydraulic head of the material in the chambers adapted to project a globule of the mobile material through said port for contact by the movable member, and means for connecting the mobile material with the source of electricity.

9. In an electric circuit closer, a movable contact arranged for connection with a source of electricity, and a carrier for a body of mobile electric current conducting material, comprising connected chambers with the connecting portion arranged in a plane below the top of the chambers and having a restricted port therein in interposed relation to the chambers and in line with the movement of the movable contact member, each of said chambers being arranged with juxtaposed vertical compartments in communication with each other and the connecting portion having the restricted port to maintain the hydraulic head of the material in said chambers constant, which head is adapted to project a globule of the mobile material from said port and maintain it in projected position through the surface tension of the material for contact by the movable contact, and means for connecting the mobile material in the chambers with the source of electricity.

10. In an electric circuit closer, a movable contact member arranged for connection with a source of electricity, a carrier for a body of mobile electric current conducting material, comprising two pairs of spaced material, and with the chambers of each pair of chambers in spaced relation for the movement of the movable contact therebetween, and the two pairs of chambers having a connecting portion arranged in a horizontal plane below the top of the chambers having a restricted port therein extending in a vertical direction through the upper horizontal wall in line with the movement of the movable support, and the hydraulic head of the mobile material in said chambers being adapted to project a globule of the material from the restricted port for contact by the movable contact to close the circuit, and means for connecting the mobile material with the source of electricity.

Signed at Passaic, in the county of Passaic, and State of New Jersey this 7th day of April, 1924.

HERBERT L. MERRICK.